United States Patent [19]

Gambrill et al.

[11] Patent Number: 5,758,965
[45] Date of Patent: Jun. 2, 1998

[54] MIXER SYSTEM

[75] Inventors: Jeffrey S. Gambrill, Hilton; Thomas Durney, Piffard, both of N.Y.

[73] Assignee: General Signal Corporation, Rochester, N.Y.

[21] Appl. No.: 767,127

[22] Filed: Dec. 5, 1996

[51] Int. Cl.$^6$ ...................................... B01F 13/08
[52] U.S. Cl. .......................... 366/273; 366/331; 384/913
[58] Field of Search .................. 366/64–66, 96–99, 366/102–104, 262–265, 270, 273, 274, 314, 330.1, 331; 384/907.1, 912, 913, 492; 416/3

[56] References Cited

U.S. PATENT DOCUMENTS

| | | |
|---|---|---|
| 4,209,259 | 6/1980 | Rains et al. . |
| 4,993,841 | 2/1991 | Lofgren et al. .............. 366/331 X |
| 5,368,390 | 11/1994 | Gambrill et al. . |
| 5,393,142 | 2/1995 | Meier ............................ 366/274 |
| 5,407,272 | 4/1995 | Meier ............................ 366/274 |
| 5,427,450 | 6/1995 | Gambrill . |
| 5,470,152 | 11/1995 | Rains ............................ 366/273 |
| 5,478,149 | 12/1995 | Quigg ........................... 366/273 |
| 5,575,571 | 11/1996 | Takebayashi et al. ......... 384/492 |

FOREIGN PATENT DOCUMENTS

| | | | |
|---|---|---|---|
| 360767 | 3/1990 | European Pat. Off. ......... | 366/273 |
| 399971 | 9/1990 | European Pat. Off. ......... | 366/273 |
| 399972 | 11/1990 | European Pat. Off. ......... | 366/273 |

*Primary Examiner*—Charles E. Cooley
*Attorney, Agent, or Firm*—M. Lukacher

[57] ABSTRACT

An improved immersible magnetically-coupled mixer has rollable bearings readily cleanable by flushing in place and easily removable and replaceable without damage to either the mixer impeller or the bearings. The rollable bearings are resistant to corrosion, capable of running without lubrication, and have low propensity for batch contamination through wear. The rolling and fixed elements of the bearings are impervious to attack by the process materials being mixed, the rollable elements, preferably balls, being formed of a hybrid ceramic such as silicon nitride, and the races being formed of either a nickel-beryllium or cobalt-chromium-tungsten alloy. A mixer impeller having a central bore is rotatably mounted on the rollable bearings on a fixed impeller shaft attached to the inner wall of a vessel at the bottom of the mixing space, which shaft extends through the impeller bore. The impeller contains magnets and is couplable in driving relationship to an external magnetic mixer drive. The impeller bore is larger in diameter than the fixed shaft, and two sets of rollable bearings are disposed between the impeller and the shaft. The bearings are exposed to the liquid in the vessel during agitation, and the impeller provides a continual flow of liquid across the bearing balls and races, preventing formation of stagnant areas of process materials within the mixer assembly and permitting cleaning of all mixer surfaces by flushing.

17 Claims, 5 Drawing Sheets

MIXER SYSTEM

The present invention relates to mixer systems, by which is meant systems for suspending, agitating and/or circulating materials, particularly liquids or liquid suspensions, and particularly to mixer systems for mixing aggressive materials, by which is meant toxic, hazardous, corrosive or other materials which need to be confined for proper handling, processing or for environmental safety or health reasons.

In order to prevent escape of aggressive materials from the vessel in which they are mixed, it is desirable to confine the mixing apparatus entirely within the vessel without shafts extending through a wall of the vessel and without resort to either dynamic or static shaft seals. It is known to provide magnetic couplings which use confinement shells or the wall of the vessel to separate the driven impeller apparatus from the motor and other drive elements.

Sealless magnetically-coupled drives are particularly desireable for mixer systems disposed at the bottom of vessels, wherein the mixer apparatus is fully immersed in the materials being mixed, and wherein shaft seals of conventional mixers are prone to leak with extended use.

Three problems in the art of bottom mixer design are 1) how to prevent corrosion of the impeller bearings through contact with aggressive materials being mixed; 2) how to clean the bearing surfaces between process batches; and 3) how to remove and replace the impeller and bearings easily and without damage to either.

Magnetically-coupled bottom mixers typically utilize a ceramic sleeve bearing or bushing disposed on a fixed stub shaft to support a magnetically-couplable rotatable impeller. See for example Rains et al, U.S. Pat. No. 4,209,259 issued Jun. 24, 1980. Ceramic sleeve bearing materials in common use are silicon carbide, alumina, and zirconia. These materials can provide excellent corrosion resistance, but they are quite brittle. Ceramic sleeve bearings are easily damaged through inadvertence during installation of an impeller onto its stub shaft within a vessel, and the damage may not be detected until the unit is placed in service, leading to substantial downtime and major loss in productivity. Such bearings are also quite vulnerable to shock and may be cracked or shattered during mixing by, for example, temporary instantaneous decoupling of the magnetic drive elements. Further, ceramic sleeve bearings may not be operated without lubrication by the process materials or by cleaning solutions, and they can be destroyed by running dry as can happen when a vessel is drained. Further, sleeve bearings in general, having close shaft tolerances over relatively large surface areas, are not readily cleanable by flush cleaning in place and tend to generate wear particles with use which may contaminate the process materials being mixed.

Thus a need exists for an improved immersible magnetically-coupled mixer having bearings which are readily cleanable by flushing in place and are easily removable and replaceable without damage to either the impeller or the bearings. Preferably, the bearings also should be resistant to corrosion of the bearing surfaces, operable without lubrication, and have low propensity for batch contamination through wear.

It is a principal object of the invention to provide a vessel mixer having improved long-wearing, corrosion resistant rolling bearings supporting a rotatable impeller, wherein the bearings are fully exposed to liquid materials in the vessel.

It is a further object of the invention to provide an improved magnetically-coupled bottom-mounted vessel mixer having long-wearing, corrosion resistant rolling bearings supporting a rotatable impeller, wherein the bearings are fully exposed to liquid materials in the vessel.

It is a still further object of the invention to provide an improved magnetically-coupled bottom-mounted vessel mixer having an open and positively-driven flow path for process liquids and flush solutions through the bearings.

It is a still further object of the invention to provide an improved magnetically-coupled bottom-mounted vessel mixer wherein the impeller and bearings are readily and reliably removable and replaceable.

It is a still further object of the invention to provide an improved magnetically-coupled bottom-mounted vessel mixer wherein rolling bearings have low propensity for shedding of particles during use.

It is a still further object of the invention to provide an improved magnetically-coupled bottom mounted vessel mixer wherein a bearing assembly may be operated without lubrication without sustaining damage to the bearing elements.

It is a still further object of the invention to provide an improved corrosion resistant rolling bearing assembly wherein the rolling and stationary elements are formed of different corrosion resistant materials.

Briefly described, in a mixer system embodying the invention an agitating impeller having a central bore is mounted for rotation on an impeller support, preferably a fixed stub shaft, attached to an inner wall, preferably the bottom, of a vessel or reactor. The impeller is provided with magnets which are magnetically couplable with a magnetic driver apparatus mounted outside the vessel coaxially with and opposite the stub shaft. In an annular passageway between the impeller and the stub shaft are disposed first and second rolling bearing assemblies having inner and outer races fixed on the stub shaft and impeller, respectively. The bore extends through the upper and lower surfaces of the impeller hub, and the impeller is off-spaced from the surface of the wall of the tank to provide a flowpath for liquid material through the bore and the bearings. The centrifugal flow of material across the vanes of the impeller during rotation causes a constant flow of material along the flowpath, preventing stagnation of process materials in the bearings and providing for simple and thorough in-place flush cleaning of the flowpath.

The bearing assemblies are open to the materials in the vessel at all times and preferably are highly corrosion-resistant. Additionally, the bearings must be capable of running from time to time without lubrication and without damage to the bearing elements. We have found that bearing assemblies having races formed from a nickel-beryllium alloy, for example, Nibryl 360 available from Brush Wellman, Cleveland, Ohio U.S.A., and rolling elements formed from a hybrid ceramic such as silicon nitride, for example, NORALIDE NBD-200 available from Norton Industrial Ceramics Corp., East Granby, Conn. U.S.A., meet these requirements. An additional advantage of nickel-beryllium alloy is that it is ferro-magnetic which facilitates substantially the precision lathe machining of races therefrom. Rolling elements may take the form of cylinders, tapered cylinders, needles, or, preferably, balls.

The foregoing and other objects, features, and advantages of the invention, as well as presently preferred embodiments thereof, will become more apparent from a reading of the following description in connection with the accompanying drawings in which.

Figure 1:
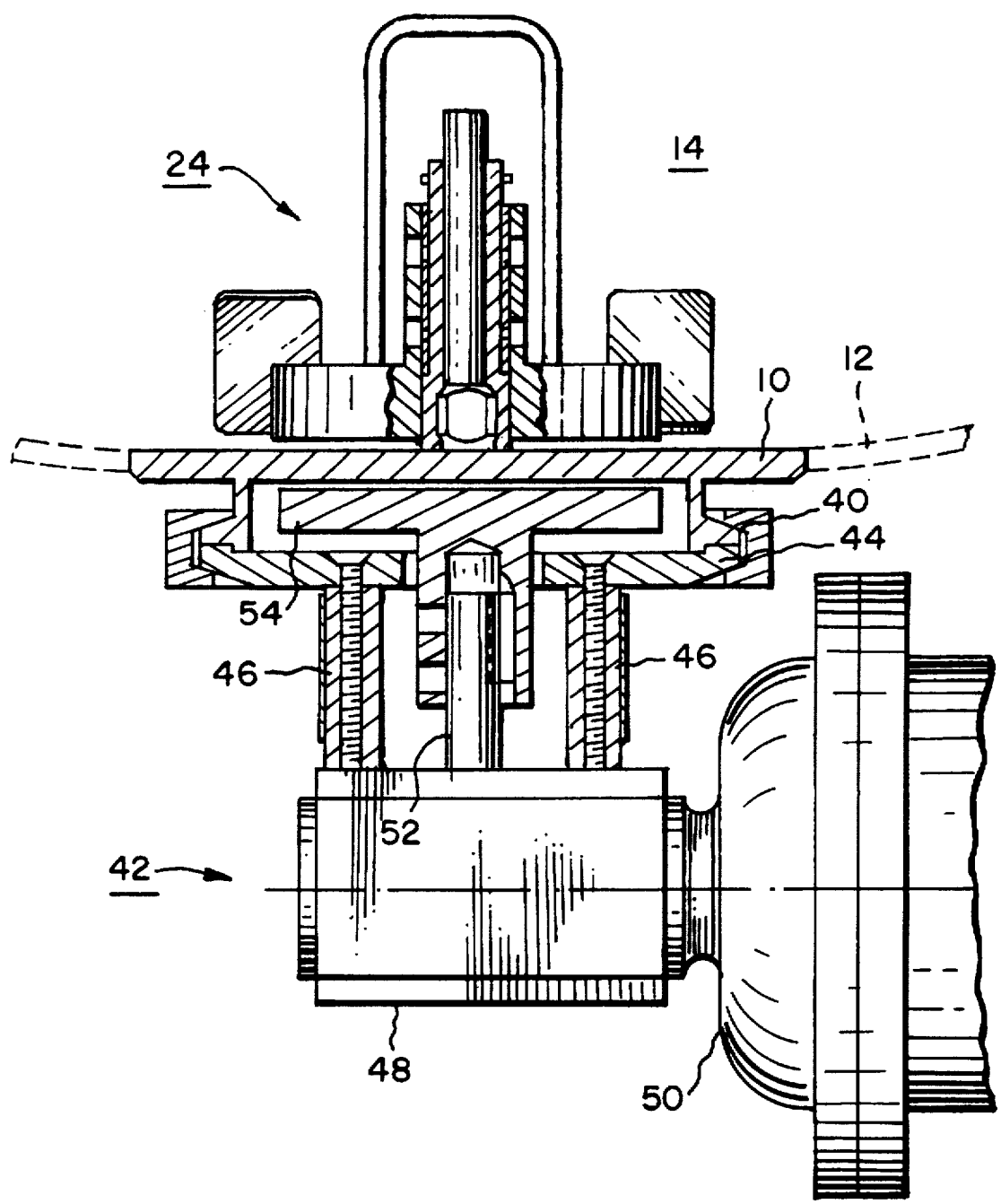
FIG. 1 is an elevational view partially in cross-section of a prior art magnetically-coupled mixer mounted in a vessel at the bottom of the mixing space, showing a sleeve bearing or journal supporting an impeller.
Figure 2:
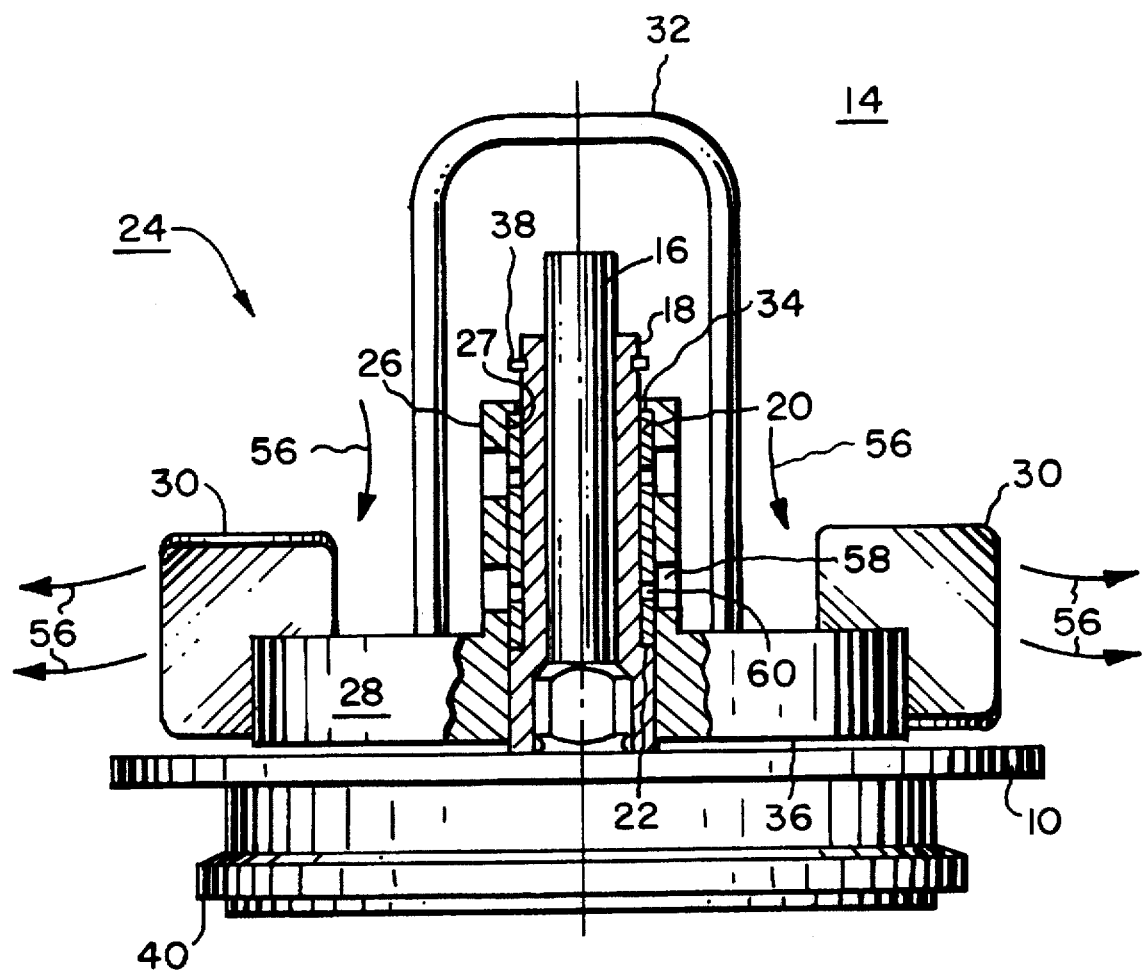
FIG. 2 is an enlarged view of the prior art in-vessel mixing apparatus shown in FIG. 1, showing the flow pattern in liquid material being mixed and the lack of flow across the bearing surfaces of the sleeve bearing.

Referring to FIGS. 1 and 2, there is shown a magnetically-coupled mixer mounted in a vessel at the bottom of the mixing space in accordance with the prior art. A tank plate 10 is inserted as by welding into the wall 12 of a vessel, preferably at the bottom of the mixing space 14 within the vessel. A stationary cylindrical stub shaft 16 is attached as by welding to plate 10 and is fitted with a stationary wear sleeve 18, preferably formed from ceramic. Wear sleeve 18 is itself provided with a precision-ground sleeve bearing 20, also called a bushing or a journal, which is retained at its lower end in step 22 in sleeve 18. Sleeve bearing 20 is formed, typically, from a ceramic such as silicon carbide. Impeller assembly 24 is disposed on sleeve bearing 20, which in the alternative may be fitted to turn with assembly 24 and slidably bear on its inner surface on wear sleeve 18, or it may be stationary with sleeve 18 and slidably bear on its outer surface on assembly 24. Assembly 24 includes a hub extension 26 having a central bore 27 of substantially the same diameter as the outer diameter of sleeve bearing 20, a hub 28 containing one or more permanent magnets 29 (not visible) encased in, preferably, stainless steel, a plurality of mixing vanes 30 attached to hub 28, and a handle 32 for removing or replacing assembly 24. Hub extension 26 is provided with an inwardly-extending flange 34 at it upper end, which flange rests upon the upper end of sleeve bearing 20, thereby defining the height of a clearance 36 between hub 28 and tank plate 10. Assembly 24 is retained on the stub shaft by retaining clip 38.

Tank plate 10 is provided on its underside with a flange 40 for mounting a magnetic drive assembly 42 for rotatably driving impeller assembly 24. Drive assembly 42 includes a drive flange 44 mutable with flange 40 and supporting standoffs 46 to transmission 48 supporting and driven by electric drive motor 50. Output shaft 52 of transmission 48 is disposed coaxially with stub shaft 16 and is provided with a drive magnet 54 magnetically couplable through tank plate 10 with magnets 29 in impeller assembly 24.

The flow pattern 56 produced in the materials being mixed by impeller assembly 24 includes only minimal flow across the bearing surface of sleeve bearing 20, even though hub extension 26 and bearing 20 are provided with a plurality of access ports 58 and 60, respectively.

Figure 3:
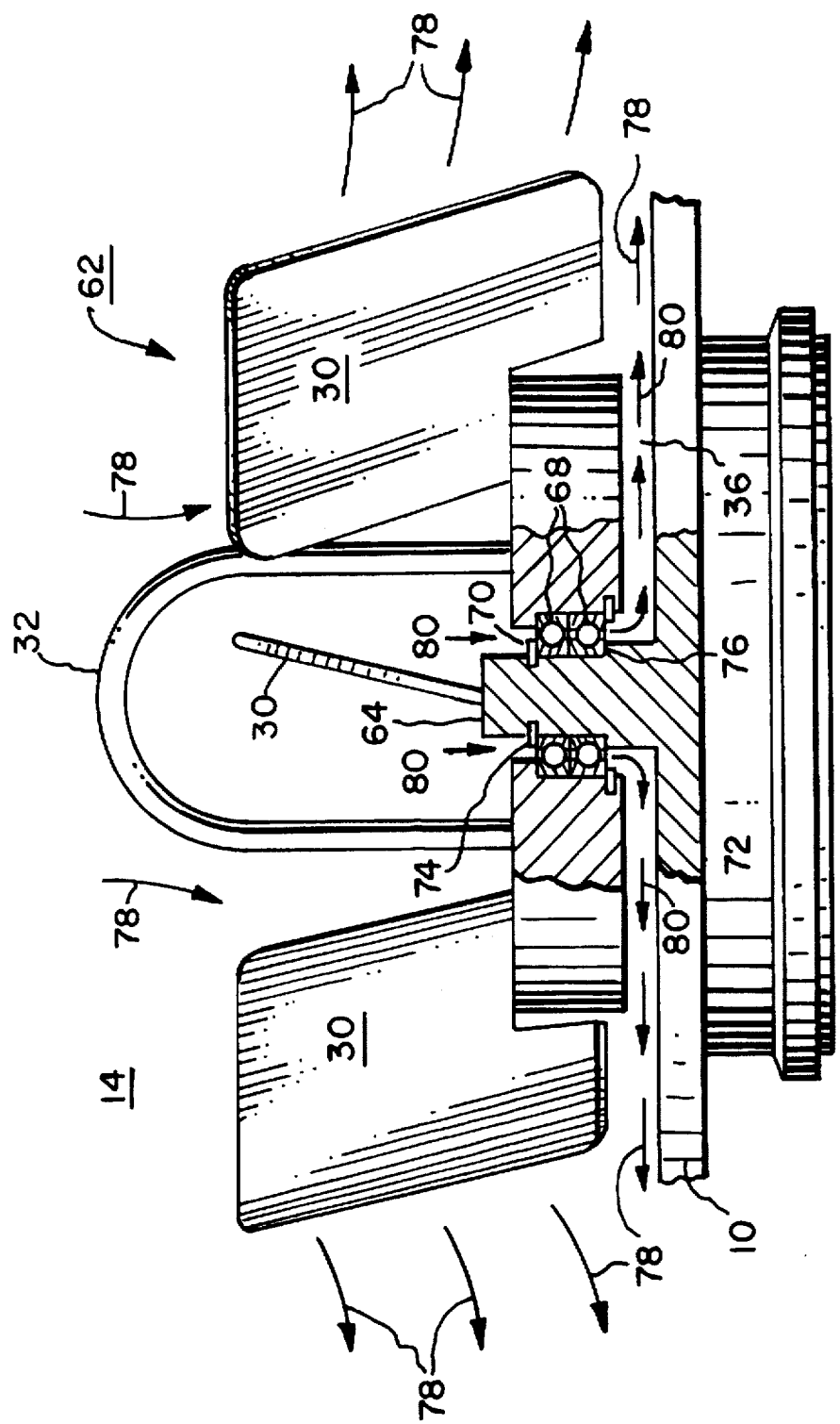
FIG. 3 is an elevational view partially in cross-section of a magnetically-couplable mixer in accordance with the invention mounted in a vessel at the bottom of the mixing space, showing the flow pattern in liquid material being mixed including flow through the bearings supporting the impeller.

A first embodiment of a magnetically-couplable impeller assembly 62 and stub shaft 64 in accordance with the invention is shown in FIG. 3. Components of assembly 62 of like function to those in prior art assembly 24 bear like numbers. A hub 28 contains magnets 29 (not visible) for rotatably driving assembly 62 in coupled relationship with magnetic drive assembly 42 (not shown in FIG. 3). Hub 28 is provided with a plurality of mixing vanes 30 and a handle 32, and contains an axial bore of substantially larger diameter than the diameter of stub shaft 64. A pair of preferably identical rollable bearing assemblies 68 are disposed in a first annular passageway 70 between hub 28 and shaft 64, and are retained by a retaining ring 72 in a groove in hub 28 and a retaining ring 74 in a groove in shaft 64. Bearing assemblies 68 rest on a step 76 in shaft 64, defining thereby the height of clearance 36 between hub 28 and tank plate 10.

Because the passageway 70 is open at its upper and lower ends to the mixing space 14, the flow pattern 78 produced in the materials being mixed by impeller assembly 62 includes a strong flow component 80 through passageway 70, bearing assemblies 68, and clearance 36. If desired, the pitch of the vanes or the direction of rotation can be reversed to provide a material flow pattern opposite in direction to pattern 78. In either flow direction, flow component 80 prevents stagnation of process materials within the mixer apparatus during mixing and permits easy and thorough cleaning of the bearing surfaces and mixer surfaces by flushing in place.

Figure 4:
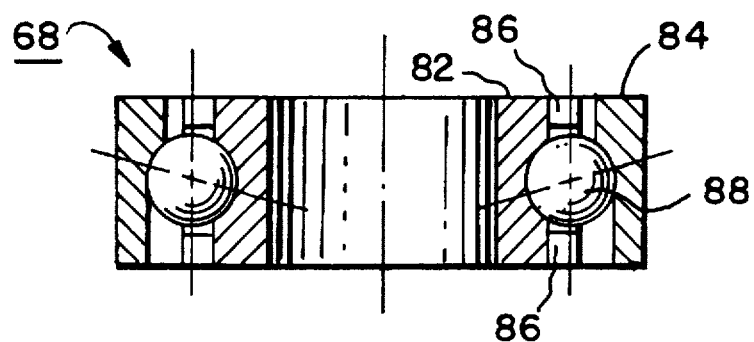
FIG. 4 is a cross-sectional view of a ball bearing assembly in accordance with the invention.

Bearing assemblies 68 are shown in detail in FIG. 4. Each assembly has an inner race 82, an outer race 84, a singular retaining ring 86, and a plurality of rollable bearing elements 88, preferably balls. Alternatively, in some applications, rolling elements in the form of cylinders, tapered cylinders, or needles may be substituted for balls 88. The construction of assemblies 68 is conventional.

For high corrosion resistance to aggressive materials, non-galling wear surfaces, long operating life, resistance to breaking or cracking, and ease of flush cleaning, we have found a superior combination of materials for forming the races and rolling elements of bearing assemblies 68. Bearing assemblies in accordance with the present invention are virtually immune to particle shedding from wear during mixing and may be run dry for extended periods of time without damage to the races or rolling elements.

Preferably, both the inner and outer races 82 and 84 are formed from a nickel-beryllium alloy, preferably NIBRYL 360. This material is highly resistant to oxidation by most acids and bases, is non-sparking, and is magnetic. Its magnetic property is highly useful in lathe machining of the material to form the races.

Preferably, the rolling elements 88 are formed of a silicon nitride hybrid ceramic, preferably NORALIDE NBD-200. This material is highly unreactive with most aggressive chemicals and has a Rockwell C hardness greater than 70.

Bearing assemblies in accordance with the invention especially improve the capabilities of bottom-mounted magnetically-coupled mixer assemblies. They may be found useful in top-mounted assemblies such as are disclosed, for example, in U.S. Pat. No. 5,368,390 issued Nov. 29, 1994 to Gambrill et al., and U.S. Pat. No. 5,427,450 issued Jun. 27, 1995 to Gambrill, wherein a stationary cylindrical hub extending through a port in a vessel wall has bearings which support a rotatable mixer shaft in a passageway in the hub, the passageway being open to the materials being mixed in the vessel. The mixer shaft may terminate in a confinement shell of a top-mounted magnetically-coupled mixer drive, or it may extend through the port and be coupled to a conventional mixer shaft drive system.

Figure 5:
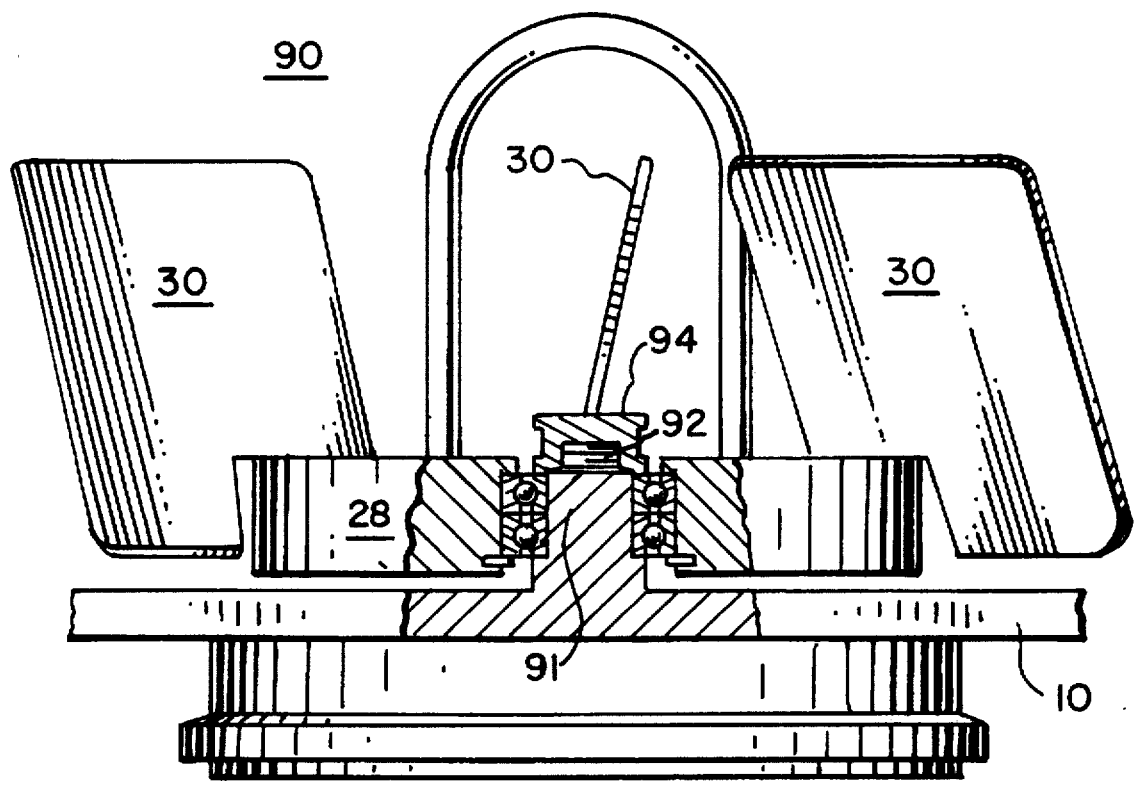
FIG. 5 is a view like that of FIG. 3, showing an alternative apparatus for retaining the impeller bearings on the stub shaft.

An alternative embodiment 90 of a supporting stub shaft is shown in FIG. 5. Installation of an impeller assembly 62 on a stub shaft at the bottom of a vessel can be difficult. For ease in installation, stub shaft 91 is provided with a threaded portion 92 at its upper end, and the bearing assemblies are retained by a threaded cap 94 instead of a retainer ring 74 as shown in FIG. 3. The threaded cap generally is installable from the top of the vessel with a long-handled wrench.

Figure 6:
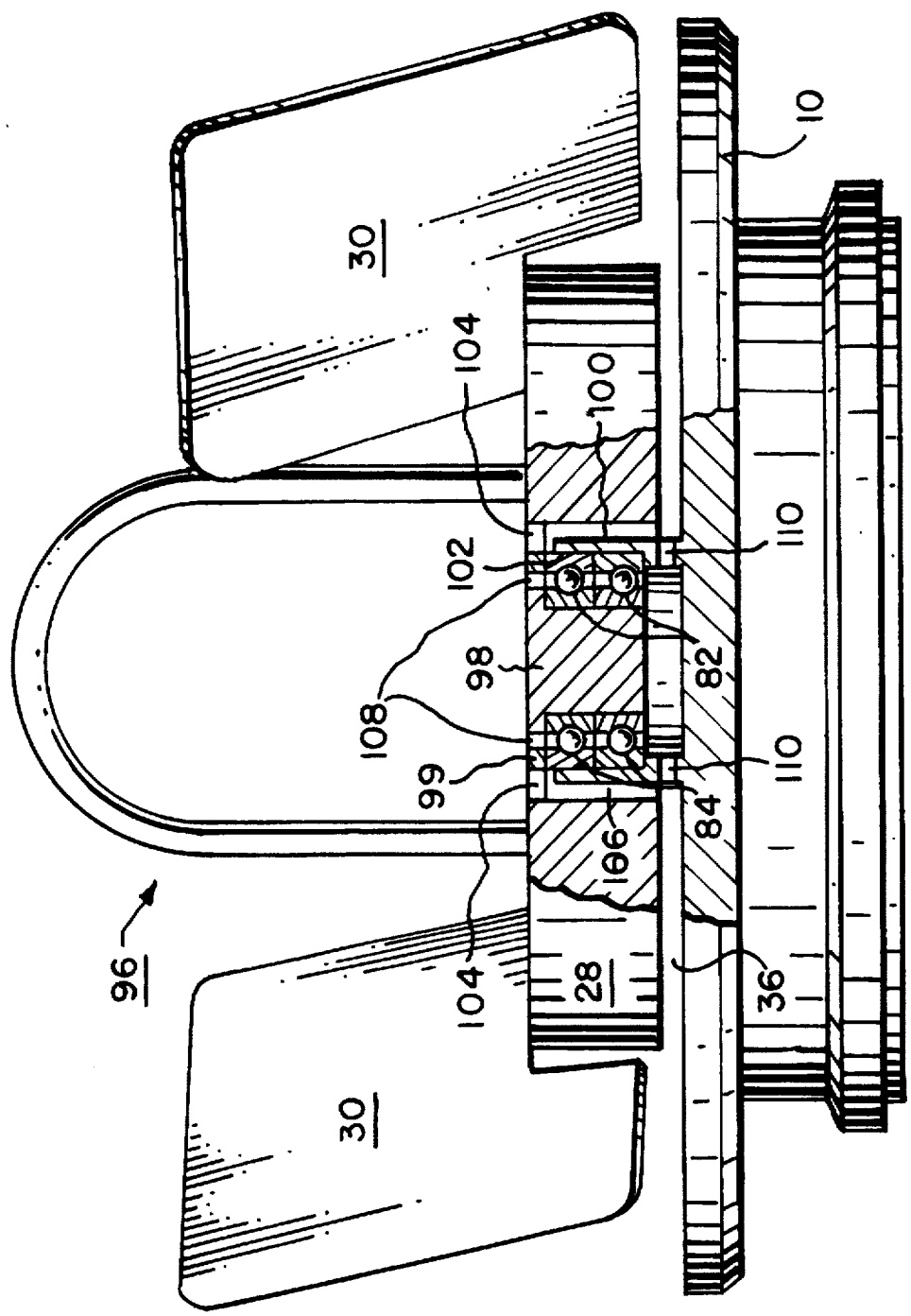
FIG. 6 is an elevational view partially in cross-section of another embodiment of a mixer in accordance with the invention.

An alternative embodiment 96 of a magnetically-couplable mixer assembly in accordance with the invention is shown in FIG. 6. Hub 28 is provided with a central stub shaft 98 mounted on a web 99 and extending downward to support inner bearing race 82 on the outer surface thereof. Stub shaft 64 is replaced by a female bearing support 100 attached to tank plate 10 and having a bore 102 for receiving outer bearing race 84. A plurality of first ports 104 are provided in web 99 to permit flow of liquid materials through a second annular passageway 106 between hub 28 and bearing support 100 to clearance 36. A plurality of second ports 108 in web 99 and third ports 110 in bearing support 100 are provided to permit flow through bearing assemblies 68 to clearance 36.

From the foregoing description it will be apparent that there has been provided improved immersible magnetically-coupled mixing apparatus including improved corrosion resistant rolling bearings, wherein the bearings are fully exposed to liquids in an annular passageway within the mixing apparatus, and wherein the bearings are easily flush-cleanable, are readily exchangeable without risk of damage to either the impeller or the bearings, are capable of dry running without damage to the bearings, and are not prone to shed particles. Variations and modifications of the herein described mixing apparatus, in accordance with the invention, will undoubtedly suggest themselves to those skilled in this art. Accordingly, the foregoing description should be taken as illustrative and not in a limiting sense.

What is claimed is:

1. A mixer system for agitation of materials within a vessel, comprising:
   a) an impeller support disposed within said vessel;
   b) impeller apparatus rotatably disposed within said vessel on said support; and
   c) a bearing assembly exposed to said materials and having races and rollable elements disposed between said impeller support and said mixer impeller, said races being formed of a nickel-beryllium alloy and said rollable elements containing silicon nitride hybrid ceramic.

2. A mixer system in accordance with claim 1 further comprising a magnetically coupled drive system for rotatably driving said impeller apparatus, said system including a first driven magnet disposed within said impeller apparatus and a second drive magnet disposed outside said vessel and drivably connected to a motor, said first and second magnets being magnetically couplable through a wall of said vessel to cause said impeller apparatus to rotate.

3. A mixer system in accordance with claim 2 wherein said impeller support is attached to an inner wall of said vessel and includes a stub shaft for receiving an inner race of said bearing assembly on an outer surface thereof, and wherein said impeller apparatus includes an impeller having an axial bore for receiving an outer race of said bearing assembly therein, said rollable elements being disposed in rolling contact between said inner and outer races.

4. A mixer system in accordance with claim 2 wherein said impeller support is attached to an inner wall of said vessel and includes an axial bore defining a cylindrical inner surface in said support for receiving an outer race of said bearing assembly on said surface, and wherein said impeller apparatus includes a stub shaft for receiving an inner race of said bearing assembly on an outer surface thereof, said rollable elements being disposed in rolling contact between said inner and outer races.

5. A mixer system in accordance with claim 1 further comprising a second bearing assembly exposed to said materials and having races and rollable elements disposed between said impeller support and said mixer impeller.

6. A mixer system in accordance with claim 1 wherein said impeller support is attached to an inner wall of said vessel and includes an axial bore defining a cylindrical inner surface in said support for receiving an outer race of said bearing assembly on said surface, and wherein said impeller apparatus includes a mixer shaft extendable through said axial bore and through a port in said vessel wall coaxial with said bore to couple with a mixer drive system external to said vessel.

7. A mixer system for agitation of materials within a vessel, comprising:
   a) a fixed impeller support shaft mounted on an inner surface of a wall of said vessel;
   b) a mixer impeller having a central bore open to said materials and being rotatably disposed in said bore on said support shaft, said impeller being immersible in said materials during operation of said mixer system; and
   c) a bearing assembly having races and rollable elements disposed within said central bore between said fixed support shaft and said rotatable mixer impeller and proving a flow path for said materials via said bore.

8. A mixer system in accordance with claim 7 wherein said impeller contains a first permanent magnet, and further comprising a mixer drive external to said vessel including a second magnet to couple through said vessel wall in driving relationship with said first magnet.

9. A mixer system in accordance with claim 7 wherein said bearing races define open cages for said rollable elements, and wherein a circulation pattern of said materials being agitated in said vessel includes said flow path through said open cages within said central bore.

10. A mixer system in accordance with claim 7 wherein said rollable elements are selected from the group consisting of balls, needles, and rollers.

11. A mixer system in accordance with claim 7 wherein said races and rollable elements are formed of corrosion-resistant materials.

12. A mixer system in accordance with claim 11 wherein said races are formed of nickel-beryllium alloy.

13. A mixer system in accordance with claim 11 wherein said rollable elements contain silicon nitride.

14. A mixer system in accordance with claim 7 further comprising a second bearing having second races and rollable elements disposed within said central bore between said support shaft and said mixer impeller.

15. A rollable bearing assembly for use in chemically aggressive environments, comprising a plurality of rollable elements containing silicon nitride hybrid ceramic disposed between inner and outer bearing races, at least one of which contains a nickel-beryllium alloy.

16. An assembly in accordance with claim 15 wherein said silicon nitride hybrid ceramic is Noralide NBD-200.

17. An assembly in accordance with claim 15 wherein said nickel-beryllium alloy is Nibryl 360.

* * * * *